(12) United States Patent
Chen (10) Patent No.: US 12,525,765 B2
(45) Date of Patent: Jan. 13, 2026

(54) ELECTROABSORPTION MODULATED LASER

(71) Applicant: Huawei Technologies Co., Ltd., Shenzhen (CN)

(72) Inventor: Xin Chen, Ipswich (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 633 days.

(21) Appl. No.: 17/964,289

(22) Filed: Oct. 12, 2022

(65) Prior Publication Data

US 2023/0035055 A1 Feb. 2, 2023

Related U.S. Application Data

(63) Continuation of application No. PCT/EP2020/060407, filed on Apr. 14, 2020.

(51) Int. Cl.
*H01S 5/026* (2006.01)
*H01S 5/10* (2021.01)
*H01S 5/12* (2021.01)

(52) U.S. Cl.
CPC .......... *H01S 5/0265* (2013.01); *H01S 5/1053* (2013.01); *H01S 5/12* (2013.01); *H01S 2304/04* (2013.01)

(58) Field of Classification Search
CPC .................................................. H01S 5/0265
See application file for complete search history.

(56) References Cited

U.S. PATENT DOCUMENTS 6,455,338 B1 9/2002 Takagi et al.
6,574,259 B1 6/2003 Fish et al.
(Continued)

FOREIGN PATENT DOCUMENTS

CN 103956652 B 8/2018
EP 1130708 A1 9/2001
(Continued)

OTHER PUBLICATIONS

James W. Raring et al., "40-GB/s Widely Tunable Low-Drive-Voltage Electroabsorption-Modulated Transmitters," Journal of Lightwave Technology, vol. 25, No. 1, Jan. 2007, 10 pages.
(Continued)

*Primary Examiner* — James A Menefee
(74) *Attorney, Agent, or Firm* — Conley Rose, P.C.

(57) ABSTRACT

An electroabsorption modulated laser having a first face, a second face, an optical cavity and an active region, the optical cavity being defined by a semiconductor substrate and having a length extending between the first face and the second face, and the active region being configured for injection of charge into the cavity and having effective bandgap energies at respective distances along the length of the cavity, the electroabsorption modulated laser comprising a first modulator section extending between a first position and a second position and comprising a first part of the active region, and a second modulator section extending between the second position and a third position and comprising a second part of the active region, wherein the bandgap energy of the first part of the active region adjacent the first position is higher than the bandgap energy adjacent the second position.

20 Claims, 4 Drawing Sheets

(56) References Cited

U.S. PATENT DOCUMENTS

| | | | |
|---|---|---|---|
| 6,678,479 B1* | 1/2004 | Naoe | H04B 10/5051 |
| | | | 398/183 |
| 2004/0036943 A1 | 2/2004 | Freund et al. | |
| 2008/0013881 A1 | 1/2008 | Welch et al. | |
| 2014/0376577 A1* | 12/2014 | Heimbuch | H01S 5/06213 |
| | | | 438/29 |

FOREIGN PATENT DOCUMENTS

| | | | | |
|---|---|---|---|---|
| JP | H07176822 A | | 7/1995 | |
| JP | 2002-131714 A | * | 5/2002 | ............ H01S 5/026 |
| WO | 2014127502 A1 | | 8/2014 | |

OTHER PUBLICATIONS

S.D. McDougall et al., "BEAM: Design and characterization of a 10 GB/s broadband electroabsorption modulator," Proceedings of SPIE—The International Society for Optical Engineering, Jun. 2004, 14 pages.

Song Liang et al., "Fabrication of InP-based monolithically integrated laser transmitters," Science China, Aug. 2018, 19 pages.

M. Claassen et al., "Two-section electroabsorption modulator with negative chirp at low insertnon loss," Electronics Letters, Nov. 7, 1996, 2 pages.

* cited by examiner

ELECTROABSORPTION MODULATED LASER

CROSS-REFERENCE TO RELATED DISCLOSURES

This is a continuation of International Patent Application No. PCT/EP2020/060407 filed on Apr. 14, 2020, the disclosure of which is hereby incorporated by reference in its entirety.

TECHNICAL FIELD

This disclosure relates to optical devices, for example electroabsorption modulated lasers.

BACKGROUND

Electroabsorption modulated lasers (EMLs) are widely used in telecommunication systems, for example in high-performance and low-cost optical device modules in applications such as large-capacity and high-speed optical access networks.

Figure 1A:
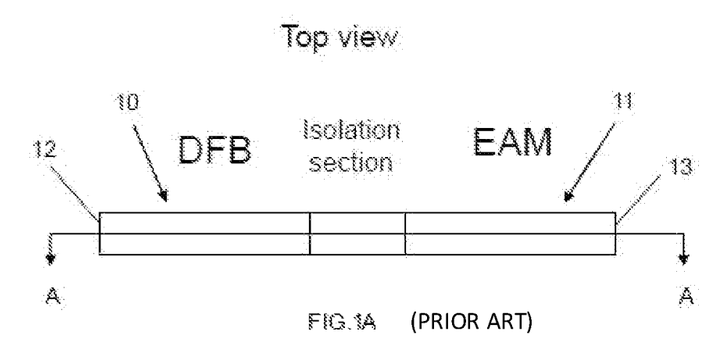
FIG. 1A shows a top view of a conventional EML.
Figure 1B:
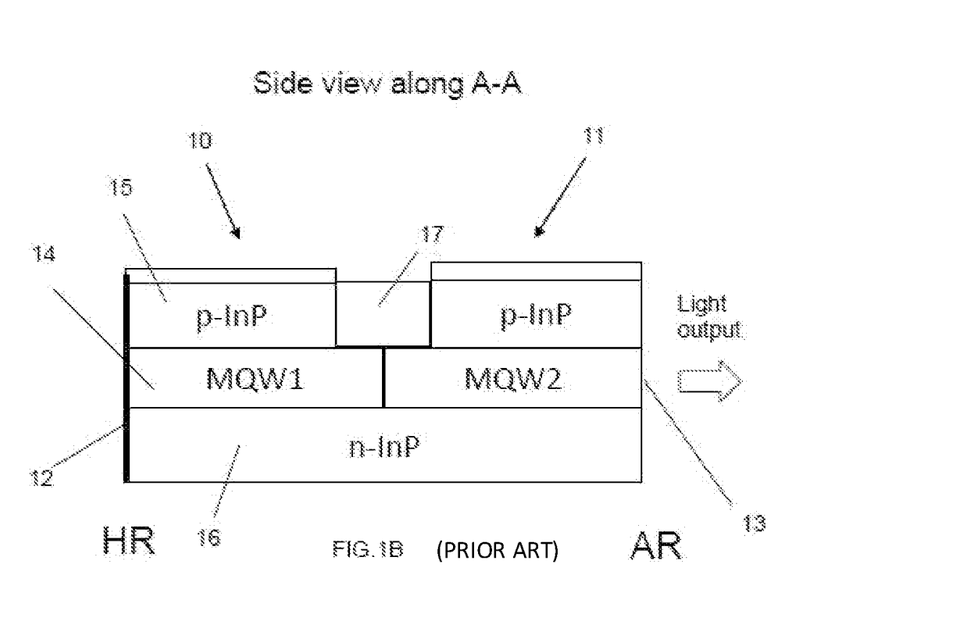
FIG. 1B is a side view along section A-A of FIG. 1A.

As shown in the example of FIGS. 1A and 1B, a standard high speed EML comprises a distributed feedback (DFB) laser 10 and an electroabsorption modulator (EAM) 11. The device generally comprises a semiconductor block which has a rear face or facet 12, a front face or facet 13 opposite to the rear facet and an optical cavity formed therebetween. The front and rear facets are normally both cleaved. The cavity traditionally comprises an active layer 14 interposed between layers of p- or n-type semiconductor material, shown at 15 and 16 respectively. One or more coating layers, such as anti-reflection (AR) or high reflection (HR) coatings, may be applied to the front and the rear facets to provide a predetermined reflectivity. In DFB lasers, a Bragg grating acts as the wavelength selective element for at least one of the faces and provides feedback, reflecting light back into the cavity to form the resonator. The rear face of the DFB is generally coated with a HR coating to enhance the power output. In an EAM, the front facet at the emissive face is generally coated with an AR coating to reduce the facet reflection. In some implementations, an EML may alternatively comprise a distributed Bragg reflector (DBR) laser in place of the DFB laser.

In an EML, the isolation between the laser and EAM is conventionally achieved by etching away the top layer of the substrate by a depth of approximately 1.0 to 2.5 micrometers ($\mu$m), shown at 17, or by ion-implantation.

Normally, EMLs employ the quantum confined Stark effect (QCSE) to change the absorption of the device. When an external electric field is applied to the device, the electron states shift to lower energies, while the hole states shift to higher energies, increasing the permitted light absorption at the lasing wavelength. Furthermore, electrons and holes are shifted to opposite sides of the well, which decreases the overlap integral, reducing the recombination efficiency of the system. The QCSE allows optical communication signals to be switched on and off rapidly, such that light can be transmitted through the device as "0" and "1" signals.

The DFB and EAM sections of an EML device are traditionally joined using a butt-couple process (BC), whereby the EAM section is overgrown on the wafer. The DFB and EAM sections are electrically isolated from one another by etching-away the top p-doped or n-doped layers or by ion-implantation. Using a BC process to join the EAM section to the DFB section, the active region of the EAM section has the same multiple quantum well (MQW) bandgap energy along the waveguide.

Via the Kramers-Kronig relation, it is known that a change in absorption in an EML can lead to a change in the refraction index, and a shift in the frequency of the optical wave propagating through the device. This is known as frequency chirp. Frequency chirping can result in degradation of the transmission performance for fiber-optic based communication systems, especially at a high Baud rate.

Conventional EML devices may suffer from positive frequency chirping that leads to poor transmission performance. This may be due to enhanced pulse broadening due to fiber dispersion. The chirp may be improved with a high bias level, but this can lead to a high insertion loss.

Figure 2A:
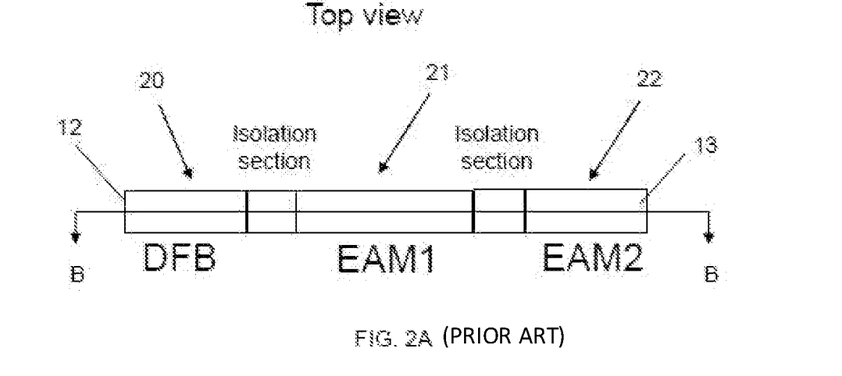
FIG. 2A illustrates a top view of an EML with two EAM sections.
Figure 2B:
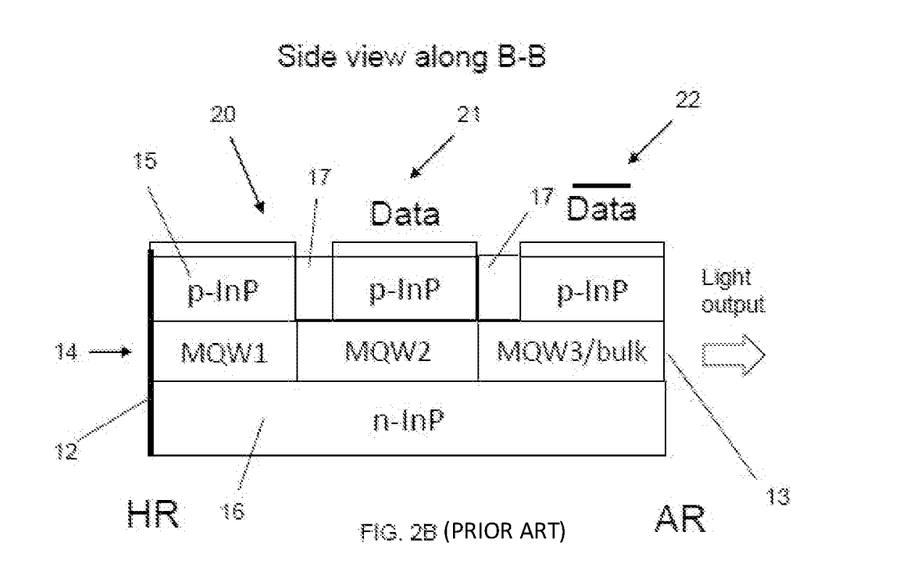
FIG. 2B is a side view along section B-B of FIG. 2A.

It has previously been proposed to use a two-section EML structure, as shown in FIGS. 2A and 2B, that can modify the EML chirp with data and data-bar modulation. Such a device has a DFB section 20. The first modulator section EAM1 21 with MQW2 is different from EAM2 22 with MQW3 or bulk in a length, or bias condition, or EAM2 may have different bandgap energy for MQW3/bulk. Although a two section electroabsorption modulator EML may improve the frequency chirp, manufacture of such a device generally requires two butt-couple over-growths for the two section EAM if MQW2 and MQW3 have different bandgap energies.

The sections EAM1 21 and EAM2 22 can be of the same active composition (MQW), but with different bias conditions, but the extinction ratio (ER) may be compromised.

It is desirable to develop a device that is less prone to such problems.

SUMMARY

There is provided an EML having a first face, a second face, an optical cavity and an active region, the optical cavity being defined by a semiconductor substrate and having a length extending between the first face and the second face, and the active region being configured for injection of charge into the cavity and having effective bandgap energies at respective distances along the length of the cavity, the EML comprising a first modulator section extending between a first position and a second position and comprising a first part of the active region, and a second modulator section extending between the second position and a third position and comprising a second part of the active region, wherein the bandgap energy of the first part of the active region adjacent the first position is higher than the bandgap energy adjacent the second position.

The EML may comprise a DFB laser optically coupled to the first modulator section.

The bandgap energy of the first part of the active region may vary at distances along the cavity due to variations in composition of the first part of the active region.

When a current is applied to the laser, the electric field of the first part of the active region may vary at distances along the cavity due to variations in doping concentration of a semiconductor layer of the optical cavity and/or thickness of the first part of the active region.

The third position may be at the second face. The device may be configured such that the second face is the emissive face of the device. This may allow the device to be integrated with further optically functional structures. For example, a Mach-Zehnder modulator, or an amplifier.

The first modulator section and the second modulator section may be electrically isolated from each other. This may allow the first and second modulator sections to be controlled independently.

The first modulator section and the second modulator section may be configured to be modulated by a common driver.

The first modulator section may be data modulated and the second modulator section may be data-bar modulated.

The bandgap energy of the second part of the active region adjacent the second position may be substantially the same as the bandgap energy at the third position.

The average bandgap energy of the first part of the active region may be lower than the average bandgap energy of the second part of the active region.

The second face may be coated with an anti-reflection coating. This may reduce facet reflection in the device. This may improve the performance of the device.

The active region may be elongated in a direction extending between the first face and the second face.

The device may further comprise a waveguide extending with the optical cavity for inducing light in the cavity to travel along the length of the cavity. This may efficiently allow emitted light to travel along the cavity.

The waveguide may have substantially constant width. This may be convenient for manufacturing the device.

The second modulator section may comprise a part of the waveguide. Said part of the waveguide may be curved or angled relative to the remainder of the waveguide. This may reduce the facet reflection at the second face of the EML.

The waveguide may have a width between 0.5 μm to 3.0 μm. This may allow the effective refractive index of the waveguide to be selected accordingly.

The waveguide may be a ridge waveguide or a buried heterostructure waveguide. This may allow flexibility in manufacturing the laser.

The optical cavity may comprise a first semiconductor layer of a first doping type, a second semiconductor layer of a second doping type opposite to the first type, and the active region may be located between the first and second semiconductor layers. This is a convenient configuration for manufacturing the device.

According to a second aspect there is provided a method of growing the active region of an EML having a first modulator section and a second modulator section, the first modulator section being optically coupled to a laser, the first modulator section comprising a first part of the active region and the second modulator section comprising a second part of the active region, the method comprising growing the first part of the active region past a mask such that the average bandgap energy of the first part of the active region is lower than the average bandgap energy of the second part of the active region. This may allow the device to be manufactured more efficiently.

The mask may be tapered such that the width of the mask at the interface between the first modulator section and the laser is narrower than the width of the mask at a distance from the interface. This may allow the bandgap energy of the first part of the active region adjacent the interface with the laser to be higher than the bandgap energy at a distance from the interface. This may result in improved performance of the device.

BRIEF DESCRIPTION OF DRAWINGS

The present disclosure will now be described by way of example with reference to the accompanying drawings. In the drawings.

DETAILED DESCRIPTION

Figure 3A:
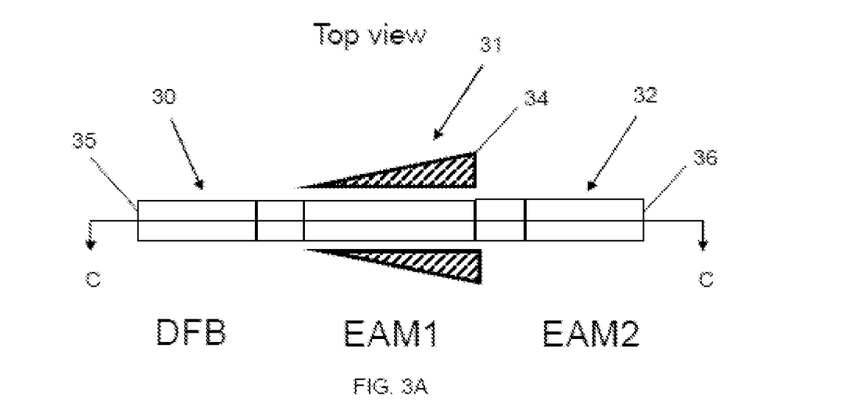
FIG. 3A illustrates a top view of an example of an optical device.
Figure 3B:
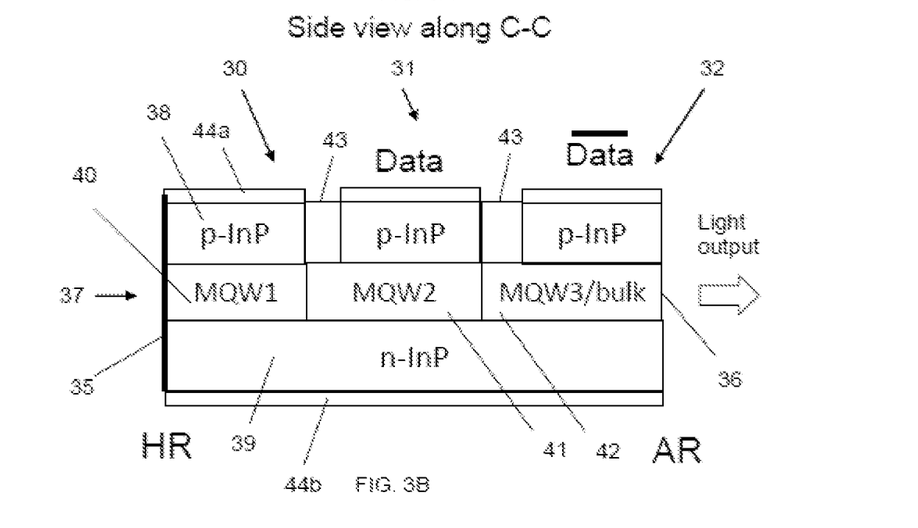
FIG. 3B is a side view along section C-C of FIG. 3A.

In one exemplary embodiment, as illustrated in FIGS. 3A and 3B, an EML device comprises a DFB laser 30, a first EAM section 31 and a second EAM section 32. The DFB laser 30 comprises a semiconductor block which has a first, rear face 35. The second, front face 36 of the EML device is opposite to the rear face and an optical cavity is formed therebetween. The front and/or rear faces may be cleaved facets. It is preferable that the front and rear facets of the device are aligned parallel to one another. A HR coating may be applied to the rear facet. This facet 35 acts as a rear reflector. The front facet 36 at the emissive face of the device is coated with an AR coating to reduce the facet reflection. The grating of the DFB laser section 30 (not shown) may be a full grating, a λ/4 grating or a partial grating.

In the example shown in FIGS. 3A and 3B, the optical cavity of the EML comprises an active layer 37 interposed between layers of p- and n-type semiconductor material, shown at 38 and 39 respectively in FIG. 3B. In this example, the semiconductor layers are made from Indium phosphide (InP). However, other semiconductor materials, such as Gallium arsenide (GaAs), may be used. The material forming the cavity may be selectively doped in the region of the p- and n-type layers. The layers are defined in a substrate. The MQW1, MQW2 and MQW3 in the active region of the device are shown at 40, 41 and 42 respectively.

The DFB, EAM1 and EAM2 sections are separated by an isolation section, indicated as 43 in FIGS. 3A and 3B. In these isolation sections, there is no current injection into the device and the DFB, EAM1 and EAM 2 sections are electrically isolated from one another. The length of the isolation section may be from approximately 40 to 100 μm and the etch depth in this section from the top of the semiconductor substrate may be approximately 0.8 to 2.0 μm. The top p-InP layers may be etched away between the DFB and EAM and the first and second EAM sections to achieve electrical isolation between the sections of the device, such that they may be independently controlled.

A waveguide, the profile of which is shown in the top view of FIG. 3A, extends along the optical cavity for inducing light in the cavity to travel along the length of the cavity. The waveguide comprises a material with a refractive index greater than that of the surrounding substrate. Light is emitted from the end of the waveguide at the front face of the device.

The waveguide may be a ridge waveguide, preferably a shallow ridge waveguide. A ridge waveguide may be created by etching parallel trenches in the material either side of the waveguide to create an isolated projecting strip, typically less than 10 μm wide and several hundred μm long. A material with a lower refractive index than the waveguide material can be deposited at the sides of the ridge to guide injected current into the ridge. Alternatively, the ridge may be surrounded by air on the three sides that are not in contact with the substrate beneath the waveguide. The ridge may also be coated with gold to provide electrical contact and to assist heat removal from the ridge when it is producing light.

Alternatively, the waveguide may be a buried heterostructure waveguide. The waveguide of the device may be straight or curved. The waveguide width for the EAM section is preferably between 0.5 μm to 3.0 μm. The waveguide widths of the DFB and the two EAM sections can be different, or they may be the same (as is the case for the example shown in FIG. 3A). The width may be chosen to allow the effective refractive index of the waveguide to be selected accordingly. The waveguide of the EML may have substantially constant width.

The device comprises a pair of electrodes 44a, 44b disposed on either side of the semiconductor substrate. In the active region 37, light emission is stimulated from the active region of the laser section of the device by applying a current across the electrodes 44a, 44b. The electrodes for the EAM sections may be, for example, lumped electrodes or travelling wave electrodes.

As can be seen in FIG. 3B, the second, front face 36 of the device is the emissive face, where light is output from the device. The optical device may be integrated with further optically functional structures. For example, the device may further comprise a semiconductor optical amplifier adjacent to the second face 36.

Figure 3C:
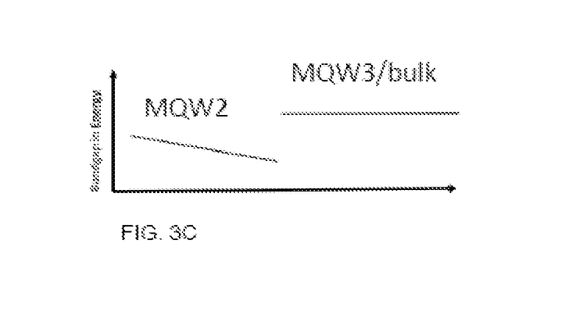
FIG. 3C illustrates an example of the variation in bandgap energy of the active region of the EAM sections of the optical device shown in FIGS. 3A and 3B.

The first modulator section extends between a first position and a second position and comprises a first part of the active region. The second modulator section extends between the second position and a third position and comprises a second part of the active region. As shown in FIG. 3C, the bandgap energy of the first part of the active region adjacent the first position is higher than the bandgap energy of the first part of the active region adjacent the second position.

Such a variation in bandgap energy of the active region in the EAM section may be achieved by using selective area growth (SAG) to couple the EAM1 section 31 to the DFB section 30.

The EML device described above may be manufactured by depositing material onto a substrate to grow and couple the modulator and laser sections of the device. Generally, metal oxide chemical vapour deposition (MOCVD) source material arriving from the gas phase will grow epitaxially in regions which are not masked. When growing the modulator section, a dielectric mask can be deposited on at least one side, and preferably both sides, of the EAM region of the device. Where source material lands on the mask (which may be, for example a Silicon dioxide ($SiO_2$) dielectric mask), it will not readily nucleate.

An example of the profile of a mask used in the SAG process to produce the two-EAM section EML described herein is shown at 34 in FIG. 3A. In a preferred implementation, in order to achieve a variation in bandgap energy along the first EAM section of the device, the shape of the mask varies with distance along the EAM section of the device. The mask may be tapered. In the example of FIG. 3A, a triangular shape of mask is used. More generally, the width of the mask at the interface between the laser and the first modulator section may be narrower than the width of the mask at a distance from the interface. Preferably, the mask is widest adjacent the interface between the first and second EAM sections. However, other shapes of masks are possible.

Where source material lands on the mask, the source species deposited on the mask may re-enter the gas phase and diffuse, due to the local concentration gradient, to find an unmasked region. In some embodiments, this may occur if the growth temperature is sufficiently high, and/or if the mask width is sufficiently narrow. Compared to a completely unmasked substrate, the MQW growth which occurs through a mask for both indium gallium arsenide (InGaAs), indium gallium arsenide phosphide (InGaAsP), InGaAlAs epi-layers may be thicker and richer in Indium, due to the relative diffusion coefficients of indium (In) and gallium (Ga) under typical MOCVD growth conditions. Thus, as a result of both the quantum-size effect and the change in alloy composition, the MQWs in parts of the active region covered by a wider part of the mask are shifted to lower energy band gaps than regions covered by a narrower part of the mask.

Therefore, material forming part of the EML device described herein may be grown so as to define a variation in composition of the active region with distance from an interface between the first modulator section and the laser using selective area growth. By using a tapered mask, as illustrated in FIG. 3A, the bandgap energy of the active region in the first EAM section of the device can be varied, as illustrated in FIG. 3C. Furthermore, when a bias voltage is applied to the device, the electrical field across the active region in the EAM section may vary at distances along the cavity due to variations in doping concentration and thickness.

Figure 4A:
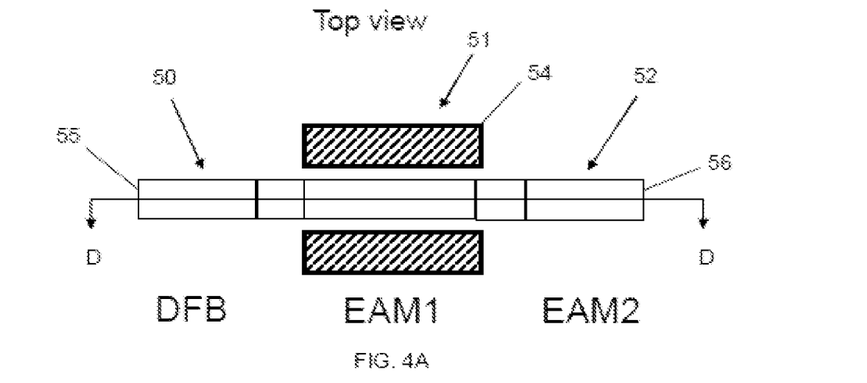
FIG. 4A illustrates a top view of an example of an optical device.

In a further embodiment, as illustrated in FIG. 4A, a rectangular shaped mask 54 may be used to grow the active region in the first EAM section 51. The EML device comprises a DFB laser 50, a first EAM section 51 and a second EAM section 52. The sections 50, 51, 52 are separated by isolation sections, shown at 53. The DFB laser 50 comprises a semiconductor block which has a first, rear face 55. The second, front face 56 of the EML device is opposite to the rear face and an optical cavity is formed therebetween. The optical cavity of the EML comprises an active layer 57 interposed between layers of p- and n-type semiconductor material, shown at 58 and 59 respectively in FIG. 4B. The multiple quantum wells MQW1, MQW2 and MQW3 in the active region of the device are shown at 60, 61 and 62 respectively. A pair of electrodes 63a, 63b are disposed on either side of the semiconductor substrate. In the active region 67, light emission is stimulated from the active region of the laser section of the device by applying a current across the electrodes 63a, 63b. The electrodes for the EAM sections may be, for example, lumped electrodes or travelling wave electrodes.

Figure 4B:
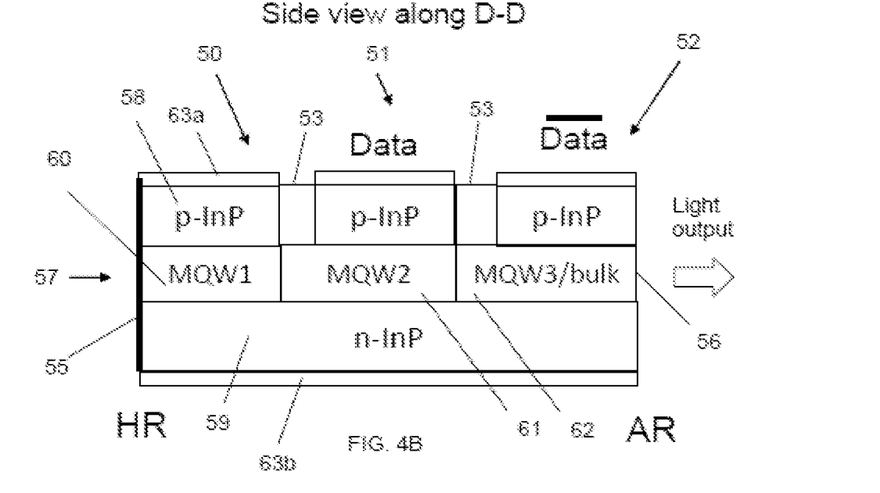
FIG. 4B is a side view along section D-D of FIG. 4A.
Figure 4C:
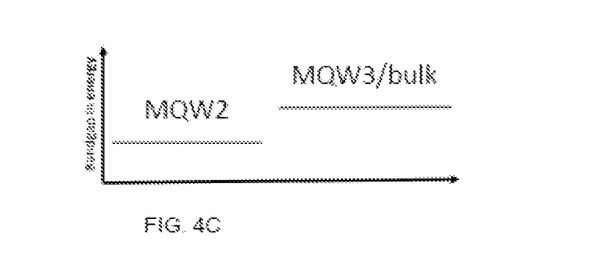
FIG. 4C illustrates an example of the variation in bandgap energy of the active region of the EAM sections of the optical device shown in FIGS. 4A and 4B.

In this example, SAG using the rectangular mask 54 may be used to couple the first EAM section 51 to the DFB section 50. The mask 54, which may be made from a dielectric such as $SiO_2$, is used to enhance the growth of the MQW2 region 61 in the first modulator section 51. As a result, the MQW2 section 61 of the active region will have a lower average bandgap energy than the MQW3 section 62 of the active region in the second EAM section 52 (as shown in FIG. 4C) and one SAG growth, rather than two butt-couple growths, may be used to form the EML device.

Therefore, as described above, SAG may be used to couple the first EAM section to the DFB section and/or the second EAM section. A mask made from a dielectric such as $SiO_2$ can be used in the EAM region to enhance the growth of the MQW2 region. As a result, the average bandgap energy of the MQW3 region is greater than the average bandgap energy of the MQW2 region.

Where a tapered mask is used, the growth may be enhanced selectively along the waveguide of the first EAM section. As a result, the MQW2 section of the active region in the EAM section of the device may have a higher bandgap energy close to the interface with the DFB section, and a lower bandgap energy towards the second EAM section. The mask shape is preferably variable along the waveguide. Consequently, the MQW2 section in the first part of the EAM may have a variable bandgap energy along the waveguide, instead of a constant bandgap energy.

The bandgap energy of the MQW3 section in the second EAM section of the device is preferably constant, but may vary.

In either of the embodiments described above, the part of the waveguide in the second modulator section may be curved or angled relative to the remainder of the waveguide. This may reduce the facet reflection at the second face of the EML.

A method of growing the active region of an EML having a first modulator section and a second modulator section may be summarised as follows. The EML has a first modulator section optically coupled to a laser section at one end. At its other end, the first modulator section is optically coupled to the second modulator section. The first modulator section comprises a first part of the active region and the second modulator section comprises a second part of the active region. The method comprises growing the first part of the active region past a mask such that the average bandgap energy of the first part of the active region is lower than the average bandgap energy of the second part of the active region.

In the resulting EML (which may be the EML described for either of the embodiments above), the first modulator section may comprise the mask used in the manufacture of the device.

As described above with reference to FIGS. 3A to 3C, the mask may be tapered such that the width of the mask at the interface between the first modulator section and the laser is narrower than the width of the mask at a distance from the interface. For example, the mask may have a triangular or trapezoidal shape. Where such a mask is used, for a device where the EML comprises a first modulator section extending between a first position and a second position and comprising a first part of the active region, and a second modulator section extending between the second position and a third position and comprising a second part of the active region, the method may comprise growing the first part of the active region of the first modulator section so as to define a variation in bandgap energy in the modulator with distance from a first position and a second position in the first modulator section, wherein the bandgap energy of the first part of the active region adjacent the first position is higher than the bandgap energy adjacent the second position.

Therefore, the material forming the first modulator section (the EAM1 section 31, 51) may be grown by depositing material (for example, MOCVD or dopant material) past a mask in a selective area growth process during coupling of the different sections of the EML device in the EAM1 region. As a result, the active region of the second modulator section will have a higher average bandgap energy than the active region of the first modulator section. In a preferred implementation, the width of the mask at the interface between the laser and first modulator section of the device is narrower than the width of the mask at a distance from the interface. As a result, the bandgap of MQW2 can have higher energy (with less absorption) at the start of the EAM1 section, and the absorption will be distributed along the EAM1 section, which may result in less saturation in this section of the device.

Consequently, using the structure described above, the EAM1 section may perform the data modulation, while the EAM2 section may provide the chirp compensation without too great a penalty on extinction ratio. The chirp compensation depends on the length, voltage bias, and peak-to-peak voltage of the EAM2 section, i.e. the chirp compensation is tuneable.

The method of growing the active region of the device described above may be performed during butt-coupling of the first optical modulator section to the laser. The first and second EAM sections are grown in the same butt-couple growth. This selective area growth may therefore reduce two overgrowths to just one overgrowth. This may reduce the cost of a chip comprising the EML device and increase yield.

The first EAM and second EAM sections may be controlled under the same direct current (DC) bias. The first EAM and second EAM sections may be under single modulation from the same driver (data and data-bar respectively), as illustrated in FIGS. 3B and 4B.

A two-section EAM waveguide as described herein may therefore realize a chirp controlled EML, with the first EAM section EAM1 under data modulation with a length of $L^1$, and the second EAM section EAM2 with a short wavelength MQW under data-bar modulation with a length of $L_2$. When SAG is used, the tandem EAM structure can be realized using one SAG growth, instead of two butt-couple growths.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the disclosure.

What is claimed is:

1. An electroabsorption modulated laser, comprising:
    a first face;
    a second face;
    an optical cavity configured to be disposed in a semiconductor substrate and comprising a length extending between the first face and the second face;
    an active region comprising a first part, a second part, and a plurality of bandgap energies at respective distances along the length, wherein the active region is configured to inject charge into the optical cavity;
    a first modulator section extending between a first position and a second position and comprising the first part; and
    a second modulator section extending between the second position and a third position and comprising the second part,
    wherein a first bandgap energy of the first part decreases from the first position to the second position, and
    wherein a second bandgap energy of the second part is substantially constant.

2. The electroabsorption modulated laser of claim 1, further comprising a distributed feedback laser optically coupled to the first modulator section.

3. The electroabsorption modulated laser of claim 1, wherein the first part comprises variations in composition, and wherein the variations are configured to vary the first bandgap energy the respective distances along the optical cavity.

4. The electroabsorption modulated laser of claim 1, wherein when a current is applied to the electroabsorption modulated laser, an electric field of the first part varies at the respective distances along the optical cavity, wherein the first part comprises variations in doping concentration, and wherein the variations are configured to vary a semiconductor layer of the optical cavity and/or thickness of the first part.

5. The electroabsorption modulated laser of claim 1, wherein the third position is at the second face.

6. The electroabsorption modulated laser of claim 1, wherein the second face is an emissive face of the electroabsorption modulated laser.

7. The electroabsorption modulated laser of claim 1, wherein the first modulator section and the second modulator section are electrically isolated from each other.

8. The electroabsorption modulated laser of claim 1, wherein the first modulator section and the second modulator section are configured to be modulated by a common driver.

9. The electroabsorption modulated laser of claim 1, wherein the first modulator section is data modulated and the second modulator section is data-bar modulated.

10. The electroabsorption modulated laser of claim 1, wherein a third bandgap energy of the second part adjacent the second position is substantially the same as a fourth bandgap energy at the third position.

11. The electroabsorption modulated laser of claim 1, wherein a first average bandgap energy of the first part is lower than a second average bandgap energy of the second part.

12. The electroabsorption modulated laser of claim 1, wherein the second face is coated with an anti-reflection coating.

13. The electroabsorption modulated laser of claim 1, wherein the active region is elongated in a direction extending between the first face and the second face.

14. The electroabsorption modulated laser of claim 1, further comprising a waveguide extending with the optical cavity and configured to induce light in the optical cavity to travel along the length of the optical cavity.

15. The electroabsorption modulated laser of claim 14, wherein the waveguide has substantially a constant width.

16. The electroabsorption modulated laser of claim 14, wherein the waveguide has a width between 0.5 micrometers ($\mu$m) to 3.0 $\mu$m.

17. The electroabsorption modulated laser of claim 14, wherein the waveguide is a ridge waveguide or a buried heterostructure waveguide.

18. The electroabsorption modulated laser of claim 1, wherein the first modulator section comprises a mask, and wherein the mask is tapered and comprises a triangular shape, a rectangular shape, or a trapezoidal shape.

19. A method of growing an active region of an electroabsorption modulated laser, wherein the electroabsorption modulated laser has a first modulator section comprising a first part of an active region, and a second modulator section comprising a second part of the active region, and wherein the method comprises:

growing the first part of the active region past a mask such that a first average bandgap energy of the first part is lower than a second average bandgap energy of the second part of the active region, wherein a first bandgap energy of the first part varies, and wherein a second bandgap energy of the second part is substantially constant.

20. The method of claim 19, wherein the mask is tapered and comprises a triangular shape, a rectangular shape, or a trapezoidal shape.

* * * * *